C. HANSEN.
SAFETY BRAKE FOR MINE CAGES.
APPLICATION FILED SEPT. 25, 1909.

988,568.

Patented Apr. 4, 1911.
2 SHEETS—SHEET 1.

UNITED STATES PATENT OFFICE.

CHARLES HANSEN, OF EAST RAND, TRANSVAAL.

SAFETY-BRAKE FOR MINE-CAGES.

988,568.   Specification of Letters Patent.   Patented Apr. 4, 1911.

Application filed September 25, 1909. Serial No. 519,600.

*To all whom it may concern:*

Be it known that I, CHARLES HANSEN, a subject of the King of Sweden, and resident of East Rand, Transvaal, have invented certain new and useful Improvements in Safety-Brakes for Mine-Cages, of which the following is a specification.

This invention relates to a safety brake applicable to the cages, skeps and other vehicles employed for hoisting purposes in the shafts of mines, and to the cars or vehicles of elevators, lifts, hoists or other like hoisting apparatus in which the cage, skeps, car or other vehicle moves vertically between and slidingly engages skids or runners or other equivalent rigid guiding members in the shaft or well.

The object of the invention is to provide a simple and efficient safety brake arrangement, which will immediately come into operation to retard the cage or other vehicle upon the breakage of the hoisting rope or other part of the suspension gear, and bring it to rest without transmitting injurious shocks to any occupants of the vehicle, and without seriously damaging either the vehicle or shaft equipment.

My invention will be described in detail by aid of the accompanying sheet of drawings, in which—

Figure 1:
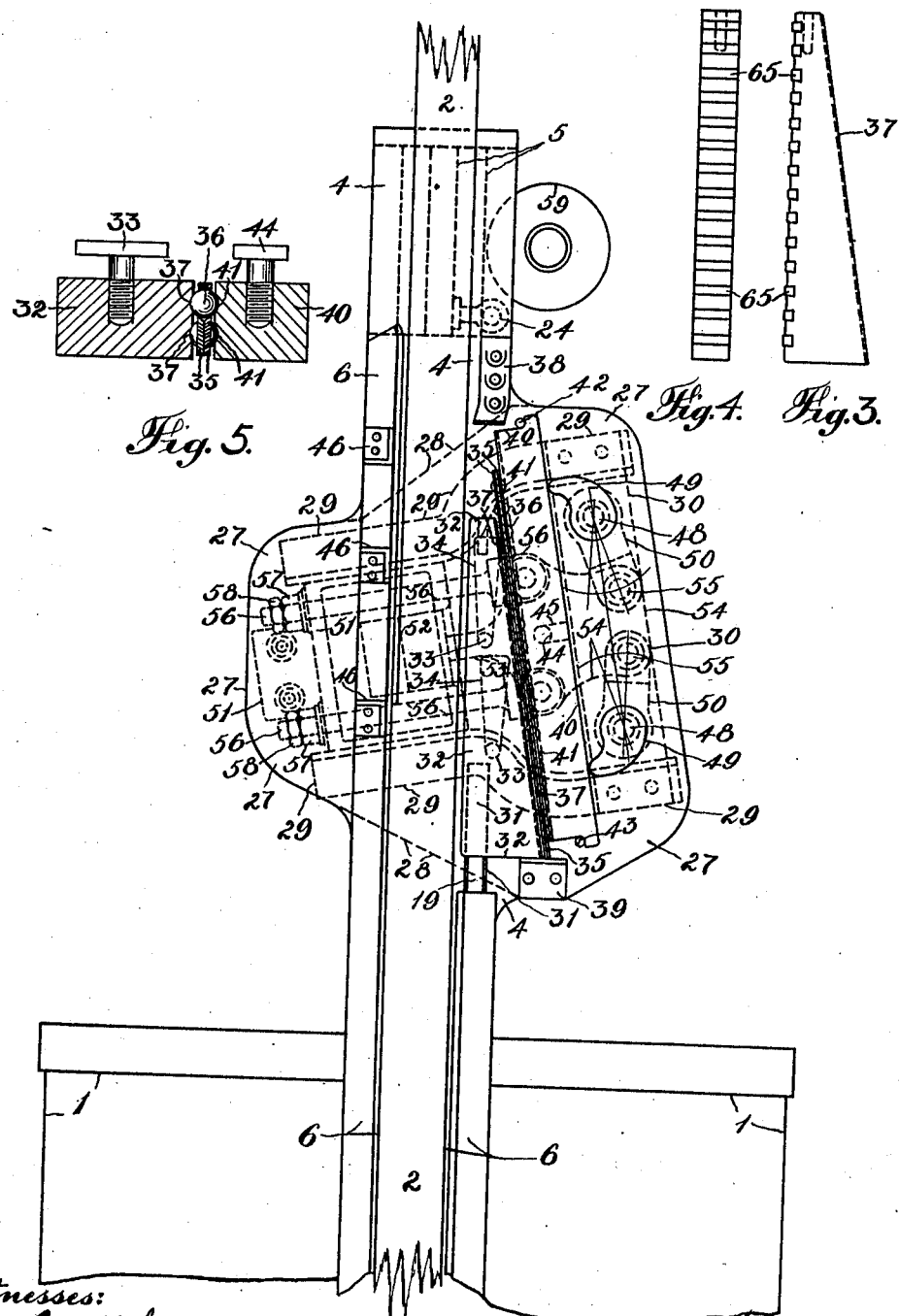
Figure 2:
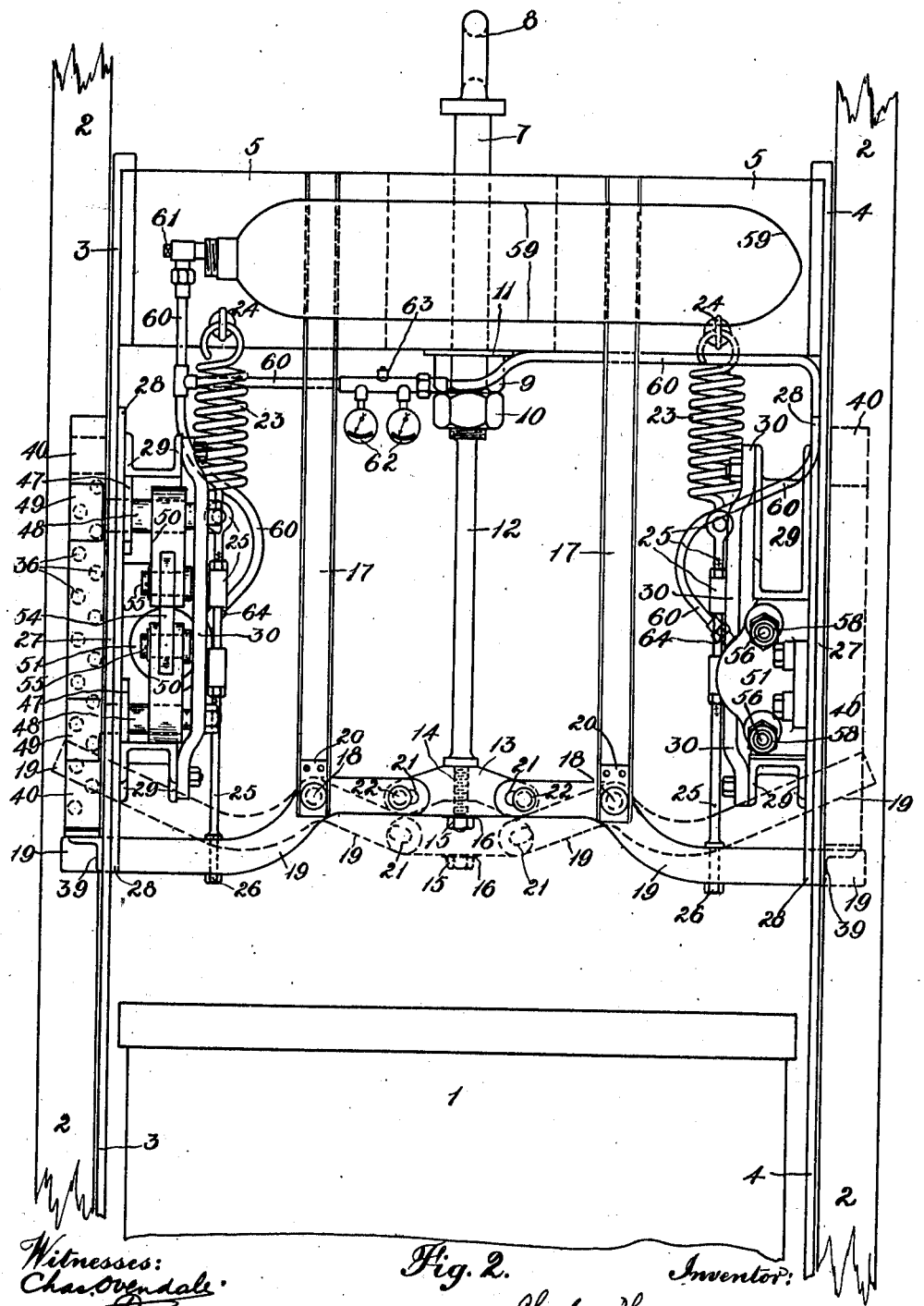

Figure 1 represents in side elevation a portion of the vehicle and its supporting and guiding means with the invention applied thereto—one side only of the device being shown. Fig. 2 is an elevation at right angles to Fig. 1. Figs. 3 and 4 are side and front elevations of one of the wedge-shaped brake members illustrating a modified construction intended for use with steel or other metal skids or runners. Fig. 5 is a detail view of one of the wedges 32, bolt or stud 33, plates 35, balls 36, back-block 40, and bolt or pin 44.

In Figs. 1 and 2, 1 designates a sinking bucket (it may be a cage, skep or other vehicle), and 2, the skids or runners provided in the mine shaft for guiding vehicle 1 as it ascends and descends the shaft. The vehicle 1 is carried or supported in a bridle or framework comprising the vertical side plates or members 3, 4, which are connected at their upper ends by the top transverse plate or member 5.

6 in Fig. 1 represents the ordinary angle-iron shoes or guides which slidingly engage the sides of the skids or runners 2.

7 represents the king bolt or draw bar having at its upper end eye-piece 8 for making connection with the hoisting rope in any ordinary or convenient manner. Draw bar 7 passes vertically through the center of transverse plate or member 5, and is threaded to receive nut 9 and lock nut 10, above which is placed washer 11, which is adapted to engage the underside of member 5 to carry or support the vehicle 1. The king bolt 7 is constructed with a vertical downward extension 12, which latter, at its lower extremity, carries a crosshead 13. Crosshead 13 is secured to the lower end of extension 12 by providing the latter with a screw-threaded projection 14, which is screwed or passed through a hole in the center of the crosshead 13, and screwing a nut 15 (above which, is placed washer 16) on the lower end of projection 14 beneath crosshead 13.

17 represents vertical members of channel or other suitable section fixed at their upper ends to transverse member 5, and carrying at their lower ends pins 18, which form fulcra for two levers 19, whose function, as hereinafter explained, is to throw the wedge-shaped member or members (hereinafter referred to) into contact with the sides of the skids or runners 2 in the event of breakage of the hoisting rope.

20 are blocks fixed between the channels 17 to provide bearings for the pins 18.

The levers 19, at their inner ends, are formed with elongated slots 21, and they are loosely connected with the ends of the crosshead 13 by pins 22. Crosshead 13 and levers 19 are shown in their normal position in full lines in Fig. 2. They assume this position in the normal running of the vehicle 1. They are shown in Fig. 2 in dotted lines in the position they are caused to assume on the breakage of the hoisting rope. In the latter event king bolt 7 falls vertically (being accelerated in its downward movement by means to be hereinafter described).

In the event of breakage of the hoisting rope, the downward movement of the king bolt 7 is accelerated by means of a pair of coiled springs 23, one for each of the levers 19. Springs 23 are attached at their upper ends to eye-pieces 24 fixed to member 5. To the lower ends of springs 23 are attached adjustable tension rods 25, which latter, at their lower ends, are fixed to the levers 19 by nuts 26. Springs 23 are maintained in tension through the rods 25, when the parts are in their normal running position.

The side plates 3, 4, of the bridle or frame are constructed at both sides with lateral projecting parts 27, which serve for carrying certain other parts of the safety brake arrangement. On the inside of the parts 27 is riveted, or otherwise secured, a stiffening plate 28, which is shaped at the sides to correspond with parts 27. On the inside of plates 28 are riveted, or otherwise secured, two pieces 29 of channel section, shaped as shown in Fig. 2, between which, at each side of the frame or bridle, are arranged the cylinder and various levers of the brake-actuating gear. The channels 29 are connected at the one end by means of a plate or member 30.

In the plates 28, and extending through the side plates 3, 4, are formed vertical slots 31, through which the outer ends of the levers 19 project, and in which slots said levers are adapted to move vertically to operate the wedge-shaped brake members 32. Two of the wedge-shaped brake members 32 are employed, one for each runner. These brake members 32 are preferably arranged as shown in the drawings to operate on opposite sides of the opposite runners. The wedges have screwed into them bolts or studs 33 (see Fig. 5) which are adapted to engage tapered slots 34 formed through the plates 27, 28. The heads of the bolts or studs 33, by engaging the inside of slots 34, serve to maintain the wedges in proper position. The slots 34 are tapered, as shown in Fig. 1, so as to allow the wedges to move toward the runners 2, when they are moved in an upward direction by the levers 19. The brake faces of the wedges which are parallel to the sides of the runners 2, are preferably serrated when intended for use with wood guides. The levers in their normal position may rest upon the upper ends of the shoes 6, as shown in Fig. 1, and the wedges rest directly upon the ends of the levers 19, in which position, bolts or studs 33, take up a position in the bottom ends of the slots 34. When the wedges are in this, their normal position, they run clear of the sides of the runners 2, as is shown in Fig. 1 of the drawings. When the wedges 32 are raised by the levers 19, they approach and engage the sides of the runners 2.

Next the inclined back or outside of each brake member 32, is arranged a pair of parallel plates 35, in holes or recesses formed in and between which are rotatably supported two parallel rows of balls 36 (see also Fig. 5). The balls 36, as seen in Fig. 5, run in two parallel grooves or bearing races 37, formed in the backs of the wedges. Balls 36 facilitate the movement of the wedge-shaped brake members 32.

38 represents top stops for limiting the upward movement of the ball plates 35, and 39 are angle-pieces which also serve as stops for the wedges 32, and ball race plates 35, in a downward direction.

At the outside of the ball race plates 35, are arranged movable back blocks 40, which, on their inner faces, are constructed with two parallel grooves 41, to form bearing races for the balls 36 (see Fig. 5).

42, 43, are pins which serve as guides for the back blocks 40, and permit the latter to move outwardly or away from the guides 2, but prevent their moving up or down. 44, in Figs. 1 and 5, represent bolts or pins fixed to the back blocks 40, and 45 are elongated guiding holes in the plates 28, 27, with which the pins or bolts 44 engage. Pins 42, 43 and 44, operate to keep the back blocks in their correct position in relation to the ball race plates 35, while allowing said blocks to move outwardly or from the skids or runners 2, as hereinafter explained.

The wedges 32, ball race plates 35 and back blocks 40 and stops 38, 39, are located on the outside of the side plates 3, 4, as is clearly shown in the drawings, so that the wedge-shaped brake members 32, when raised by the levers 19, are caused to approach the sides of the runners, and in doing so, are able to move freely upward on the balls 36, while the latter are also free to move upward against the back blocks 40.

The shoes 6, on the sides of the runners 2, opposite the wedge-shaped brake members 32, are strengthened by means of stays 46, which prevent distortion of the shoes 6, when the brake arrangement comes into operation.

47, in Fig. 2, represents reinforcing plates or pieces, two for each wedge 32, riveted, or otherwise suitably fixed, to the inside of plates 28. These plates or pieces 47, also form bushes, in which are rotatably arranged lever spindles 48. On the ends of the lever spindles 48, at the outside of the plates 27, are formed or fixed levers 49, which, as shown in Fig. 1, at their outer ends rest upon or engage the back or outside of the back blocks 40. The other and inner ends of the lever spindles 48, are revolubly supported in the plates 30. Lever spindles 48, are each constructed with a square portion, on which is arranged another lever 50. Levers 50 may, obviously, be keyed or otherwise fixed upon the spindles 48.

For each wedge-shaped brake member 32, I provide a cylinder 51. These cylinders, as shown, are bolted or otherwise suitably fixed, to the channels 29 and plates 28. In the cylinders 51, are arranged pistons 52, connected with piston rods 53, which latter are fashioned into a plate or piece 54. In the outer end of the plate or piece 54, are formed elongated holes, in which are placed pins 55, which serve for connecting the bifurcated outer ends of the levers 50. Plates 54 are formed with two other holes, and to them are loosely attached the ends of check rods or bolts 56. The check rods or bolts 56, are adapted to move through guide ways provided in the cylinders 51. The check rods or bolts 56 have screwed on their other ends nuts 57 and lock nuts 58, for limiting the movement of said rods. The check rods operate to prevent the movement of the piston 52 in the cylinder 51, beyond a given point, which point is that in which the piston is maintained by said rods or bolts 56 in the normal running of the vehicle, and when the wedges 32 are running clear of the guides 2.

59 is a cylinder, which may, as shown, be arranged parallel with transverse member 5, and be secured thereto in any convenient manner. This cylinder serves for holding liquid carbonic acid, which is admitted by tubular connections 60, to both of the cylinders 51. The pressure is constantly maintained on the pistons 52 in the cylinders 51, in the normal running of the vehicle 1.

61, in Fig. 2, represents a cock for admitting the carbonic acid through tubular connections 60 to the cylinders 51, and 62 represents pressure gages, and 63 a relief valve in the tubular connections 60. The pipes 60 connect with the cylinders 51 at 64.

Pieces of rubber or other suitable resilient material may be inserted on the faces of the wedges 32, at or in proximity to the bottom to engage the sides of the skids or runners 2, and remove grease and other adhering matter, which might militate against the effective operation of said brake members 32; this rubber insertion would also tend to insure the raising of the wedges when they come into operation. The brake faces of the wedge-shaped members 32, may, if desired, be lined with copper or other suitable material.

In the modified construction of the wedge, shown in Figs. 3 and 4, for use with steel or other metal guides, cast iron or other suitable blocks 65, are placed at suitable preferably equal distances apart across the brake faces of the wedges. These blocks, may, as shown, be dovetailed into the wedge.

The operation of the safety brake arrangement is as follows: In the event of the hoisting rope breaking, the king bolt 7 falls through transverse member 5, and in doing so, permits levers 19 to be drawn upward by springs 23. The upward movement of the levers 19 lifts wedges 32, which are thereby caused to approach and come into contact with the sides of the runners or skids 2. In moving upward, said wedges 32 move on the balls 36 in the race plates 35. After the wedges have come into contact with the sides of the skids or runners 2, the further movement of the vehicle causes the wedges 32 to force race plate 35 and back blocks 40 outwardly or away from the skids or runners 2. In moving outwardly, blocks 40, through the levers 49, rotate lever spindles 48. The rotation of spindles 48 moves levers 50 inwardly, and the latter, by virtue of their connection with plates 54, moves the pistons 52 in the cylinders 51 against the pressure of the carbonic acid gas contained within the cylinders. The gas pressure, as previously stated, is maintained in the cylinders 51, during the normal running of the cage. The inward movement of pistons 52 results in a gradually increasing brake pressure being applied upon the sides of the runners or skids 2, by the wedge-shaped brake members 32, which ultimately arrests the movement of the falling vehicle.

What I claim as my invention and desire to protect by Letters Patent is;—

1. In a safety brake for the vehicles of hoisting apparatus, the combination with the vehicle and its supporting and guiding means, of a wedge shaped brake member carried by the vehicle and adapted to engage the guiding means, means for operating said brake member from the vehicle supporting means or for maintaining it in its inoperative position during the normal running of the vehicle and for causing it to engage the guiding means on the breakage of the supporting means, a cylinder carried by the vehicle for holding high pressure fluid, a piston in said cylinder, and means which are operated by the brake member when it engages the guiding means to move the piston against the high pressure fluid in the cylinder.

2. In a safety brake for the vehicles of hoisting apparatus, the combination with the vehicle and its supporting and guiding means, of a pair of wedge shaped brake members adapted to engage the guiding means, means for operating said brake members from the vehicle supporting means or for maintaining them in their inoperative position during the normal running of the vehicle and for causing them to engage the guiding means on the breakage of the supporting means, a pair of cylinders carried by the vehicle for holding high pressure fluid, a piston in each of said cylinders and means which are operated by the brake members when they engage the guiding means to move the pistons against the high pressure fluid in their respective cylinders.

3. In a safety brake for the vehicles of hoisting apparatus, the combination with the vehicle and its supporting and guiding means, of a pair of wedge shaped brake members adapted to arrest the movement of the vehicle by engaging the guiding means, means for operating said brake members from the supporting means, a pair of cylinders carried by the vehicle for holding high pressure fluid, a piston in each cylinder, means which are operated by the brake members when they engage the guiding means to move the pistons against the high pressure fluid in their respective cylinders, and means for limiting the movement of the pistons in the direction opposite to that in which they are moved by the wedges when the latter engage the guiding means.

4. In a safety brake for the vehicles of hoisting apparatus, the combination with the vehicle and its supporting and guiding means, of a wedge shaped brake member adapted to arrest the movement of the vehicle by engaging the guiding means, means for operating said brake member from said supporting means, a movable member arranged at the back of the brake member, a cylinder for holding high pressure fluid, a piston in said cylinder, and means which engage the movable member and are operated by the brake member when the latter engages the guiding means to move the piston against the high pressure fluid in the cylinder.

5. In a safety brake for the vehicles of hoisting apparatus, the combination with the vehicle and its supporting and guiding means, of a wedge shaped brake member adapted to arrest the movement of the vehicle by engaging the guiding means, means for guiding said brake member, means for operating said brake member from said supporting means, a movable member arranged at the back of the brake member, a ball bearing between said brake and movable members, a cylinder for holding high pressure fluid, a piston in said cylinder, and means which engage the movable member and are operated by the brake member when the latter engages the guiding means to move the piston against the high pressure fluid in the cylinder.

6. In a safety brake for the vehicles of hoisting apparatus, the combination with the vehicle and its supporting and guiding means, of a wedge shaped brake member, means for guiding said brake member, means for operating said brake member from said supporting means, a movable member arranged at the back of the brake member, means for guiding said movable member, a ball bearing between said brake and movable members, means for limiting in either direction the movement of the parts constituting said ball bearing, a cylinder for holding high pressure fluid, a piston in said cylinder, means which engage the movable member and are operated by the brake member when the latter engages the guiding means to move the piston against the high pressure fluid in the cylinder, and means for limiting the movement of the piston in the opposite direction to that in which it is moved by the brake member.

7. In a safety brake for the vehicles of hoisting apparatus, the combination with the vehicle and its supporting and guiding means, of a cylinder for holding high pressure fluid, a piston in said cylinder, means for limiting the movement of the piston in one direction, a wedge shaped brake member, a movable member at the outside of said wedge shaped brake member, and means connected with the piston and engaging the movable member for moving the piston against the high pressure fluid when the brake member engages the guiding means.

8. In a safety brake for the vehicles of hoisting apparatus, the combination with the vehicle and its supporting and guiding means, of a cylinder for holding high pressure fluid, a piston in said cylinder, means for limiting the movement of the piston in one direction, a wedge shaped brake member, guiding means for said brake member, a movable member at the outside of said wedge shaped brake member, a ball bearing between said brake and movable members, means for guiding said movable member, means for limiting the movement of the parts constituting the ball bearing, a pair of spindles, levers fixed to said spindles and engaging the movable member and further levers connecting the piston and spindles as set forth.

9. In a safety brake for the vehicles of hoisting apparatus, the combination with the vehicle and its supporting and guiding means, of a wedge shaped brake member, a movable member at the back of said brake member, a ball bearing between said wedge and movable member, said bearing comprising a pair of parallel plates between which are rotatably supported balls engaging on the one side a groove in the back of the brake member and on the other side a groove in the inner face of the movable member, means for guiding the movable member and means for limiting in either direction the movement of the parts constituting the ball bearing, as set forth.

10. In a safety brake for the vehicles of hoisting apparatus, the combination with the vehicle and its supporting and guiding means, a pair of cylinders for holding high pressure fluid, pistons in said cylinders, a pair of wedge shaped brake members arranged at opposite sides of the guiding means, means for guiding said brake members, means for raising said brake members into contact with the runners on the breakage of the supporting means, a movable member for each brake member, a ball bearing between each brake member and its movable member, means for guiding said movable member, means for limiting the movement of the parts constituting the ball bearing, a pair of spindles for each brake member, a lever on each spindle engaging the movable member and a lever on each spindle connected with the piston of its cylinder, and check rods or bolts connected with the pistons for limiting the movement of the pistons in the direction of their corresponding brake members, as set forth.

11. In a safety brake for the vehicles of hoisting apparatus, the combination with the vehicle and its supporting and guiding means, said supporting means including a draw bar, a pair of cylinders for holding high pressure fluid, a vessel for holding said high pressure fluid, tubular connections between said vessel and the cylinders, a cock in said connections for closing the vessel to the cylinders, a pressure gage and relief valve in said connections, pistons in the cylinders, piston rods attached to said pistons, check rods connected with the piston rods for limiting the movement of the pistons in one direction, a pair of wedge shaped brake members arranged at opposite sides of the runners of the guiding means, means for guiding said brake members, means for lifting said brake members into contact with the runners on the breakage of the supporting means, said means comprising a pair of levers connected with and operated by the draw bar of the supporting means, and adjustable tension springs connected to the levers and a portion of the vehicle frame, a movable member arranged at the back of each brake member, means for guiding said movable member, a ball bearing interposed between each brake member and its movable member, said ball bearing comprising a pair of parallel plates between which the balls rotate, the movable member and brake member having grooves in their adjacent faces for the balls, stops for limiting the movement of the parts forming the ball bearing in either direction, a pair of spindles for each movable member, a lever on each spindle engaging its movable member and further levers on said spindles connected with their corresponding pistons as set forth.

In testimony whereof I have signed my name to this specification in the presence of two subscribing witnesses.

CHARLES HANSEN.

Witnesses:
  CHAS. OVENDALE,
  MAUD POPE.

---

Copies of this patent may be obtained for five cents each, by addressing the "Commissioner of Patents, Washington, D. C."